US012676654B2

(12) United States Patent (10) Patent No.: US 12,676,654 B2
Karjalainen et al. (45) Date of Patent: Jul. 7, 2026

(54) DETERMINING SPATIAL DIRECTION FOR TRANSMISSION AND/OR RECEPTION

(71) Applicant: Nokia Technologies Oy, Espoo (FI)

(72) Inventors: Juha Pekka Karjalainen, Oulu (FI); Sami-Jukka Hakola, Oulu (FI); Mihai Enescu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 294 days.

(21) Appl. No.: 18/699,165

(22) PCT Filed: Oct. 25, 2022

(86) PCT No.: PCT/EP2022/079797
    § 371 (c)(1),
    (2) Date: Apr. 5, 2024

(87) PCT Pub. No.: WO2023/083607
    PCT Pub. Date: May 19, 2023

(65) Prior Publication Data
    US 2025/0240067 A1     Jul. 24, 2025

(30) Foreign Application Priority Data

Nov. 12, 2021     (FI) ..................................... 20216167

(51) Int. Cl.
    *H04B 7/06*         (2006.01)
    *H04L 5/00*         (2006.01)
    *H04L 27/26*        (2006.01)
    *H04W 8/22*         (2009.01)
(52) U.S. Cl.
    CPC ......... *H04B 7/0617* (2013.01); *H04L 5/0051* (2013.01); *H04L 27/2605* (2013.01); *H04W 8/22* (2013.01)

(58) Field of Classification Search
    None
    See application file for complete search history.

(56) References Cited

U.S. PATENT DOCUMENTS

2019/0349972 A1    11/2019   Nam et al.
    2021/0112498 A1     4/2021   Duan et al.
    2023/0104494 A1*    4/2023   Flordelis ............. H04B 7/0408
                                                            455/15

(Continued)

FOREIGN PATENT DOCUMENTS

WO     2021/159452 A1     8/2021
    WO     2022/236657 A1    11/2022

OTHER PUBLICATIONS

"3rd Generation Partnership Project; Technical Specification Group Radio Access Network; NR; Radio Resource Control (RRC) protocol specification (Release 16)", 3GPP TS 38.331, V16.6.0, Sep. 2021, pp. 1-961.

(Continued)

*Primary Examiner* — Robert M Morlan
(74) *Attorney, Agent, or Firm* — Nokia Technologies Oy

(57) ABSTRACT

Disclosed is a method comprising determining a spatial direction for a time interval between a first reference signal resource set in a first time slot and a second reference signal resource set in a second time slot; and transmitting one or more uplink transmissions and/or receiving one or more downlink transmissions according to the determined spatial direction during the time interval.

20 Claims, 10 Drawing Sheets

701   Determine a spatial direction for a time interval between a first RS resource set and a second RS resource set 702   Transmit one or more UL transmissions and/or receive one or more DL transmissions according to the determined spatial direction during the time interval

(56)            References Cited

U.S. PATENT DOCUMENTS

| | | | |
|---|---|---|---|
| 2025/0016722 A1* | 1/2025 | Duan | G01S 5/04 |
| 2025/0113232 A1* | 4/2025 | Liu | H04L 5/00 |

OTHER PUBLICATIONS

"3rd Generation Partnership Project; Technical Specification Group Radio Access Network; NR; Physical layer procedures for data (Release 16)", 3GPP TS 38.214, V16.7.0, Sep. 2021, pp. 1-172.
"3rd Generation Partnership Project; Technical Specification Group Radio Access Network; NR; User Equipment (UE) radio access capabilities (Release 16)", 3GPP TS 38.306, V16.6.0, Sep. 2021, pp. 1-155.
"3rd Generation Partnership Project; Technical Specification Group Radio Access Network; NR; Physical layer procedures for control (Release 16)", 3GPP TS 38.213, V16.7.0, Sep. 2021, pp. 1-188.
"3rd Generation Partnership Project; Technical Specification Group Radio Access Network; NR; Medium Access Control (MAC) protocol specification (Release 16)", 3GPP TS 38.321 V16.6.0, Sep. 2021, pp. 1-158.
Office action received for corresponding Finnish Patent Application No. 20216167, dated Jun. 8, 2022, 7 pages.
"FL summary #1 on SRS enhancements", 3GPP TSG RAN WG1 Meeting #107-e, R1-2110964, Agenda: 8.1.3, ZTE, Nov. 11-19, 2021, 53 pages.
Office action received for corresponding Finnish Patent Application No. 20216167, dated Dec. 12, 2022, 5 pages.
International Search Report and Written Opinion received for corresponding Patent Cooperation Treaty Application No. PCT/EP2022/079797, dated Feb. 2, 2023, 14 pages.
"Enhancements on SRS in Rel-17", 3GPP TSG RAN WG1 Meeting #107-e, R1-2110786, Agenda: 8.1.3, Huawei, Nov. 11-19, 2021, 7 pages.
"Enhancements on SRS flexibility, Coverage and Capacity", 3GPP TSG RAN WG1 #107-e, R1-2112181, Agenda: 8.1.3, Nokia, Nov. 11-19, 2021, 18 pages.

* cited by examiner

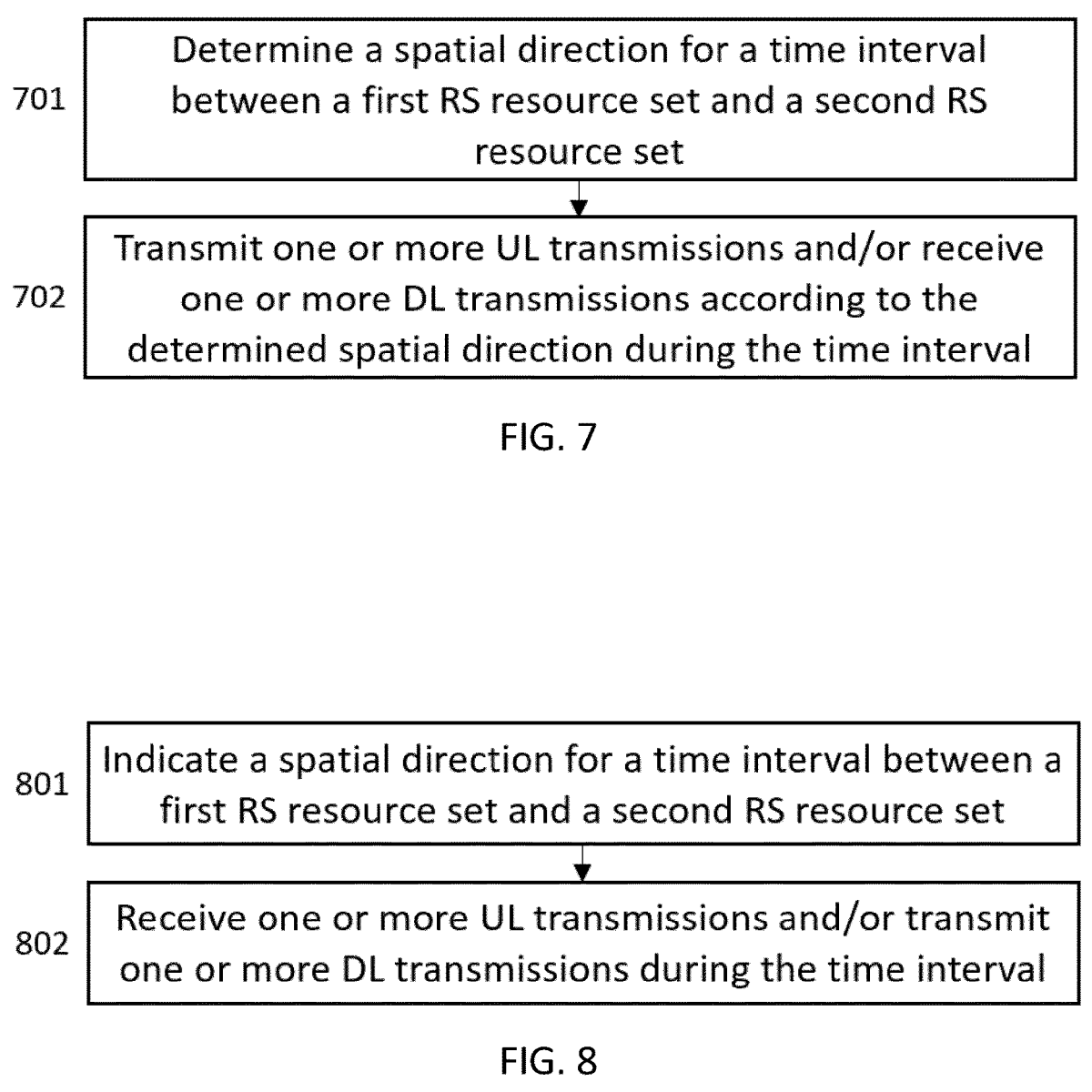

701 | Determine a spatial direction for a time interval between a first RS resource set and a second RS resource set 702 | Transmit one or more UL transmissions and/or receive one or more DL transmissions according to the determined spatial direction during the time interval

FIG. 7

801 | Indicate a spatial direction for a time interval between a first RS resource set and a second RS resource set 802 | Receive one or more UL transmissions and/or transmit one or more DL transmissions during the time interval

DETERMINING SPATIAL DIRECTION FOR TRANSMISSION AND/OR RECEPTION

RELATED APPLICATION

This application was originally filed as PCT Application No. PCT/EP2022/079797 on Oct. 25, 2022, which claims priority from Finnish Application No. 20216167, filed on Nov. 12, 2021, each of which is incorporated herein by reference in its entirety.

FIELD

The following exemplary embodiments relate to wireless communication.

BACKGROUND

As resources are limited, it is desirable to optimize the usage of network resources. A terminal device may be utilized to enable better usage of resources and enhanced user experience to a user of the terminal device.

SUMMARY

The scope of protection sought for various exemplary embodiments is set out by the independent claims. The exemplary embodiments and features, if any, described in this specification that do not fall under the scope of the independent claims are to be interpreted as examples useful for understanding various exemplary embodiments.

According to an aspect, there is provided an apparatus comprising at least one processor, and at least one memory including computer program code, wherein the at least one memory and the computer program code are configured, with the at least one processor, to cause the apparatus to: determine a spatial direction for a time interval between a first reference signal resource set in a first time slot and a second reference signal resource set in a second time slot; and transmit one or more uplink transmissions and/or receive one or more downlink transmissions according to the determined spatial direction during the time interval.

According to another aspect, there is provided an apparatus comprising means for: determining a spatial direction for a time interval between a first reference signal resource set in a first time slot and a second reference signal resource set in a second time slot; and transmitting one or more uplink transmissions and/or receiving one or more downlink transmissions according to the determined spatial direction during the time interval.

According to another aspect, there is provided a method comprising: determining, at a terminal device, a spatial direction for a time interval between a first reference signal resource set in a first time slot and a second reference signal resource set in a second time slot; and transmitting, by the terminal device, one or more uplink transmissions and/or receiving, at the terminal device, one or more downlink transmissions according to the determined spatial direction during the time interval.

According to another aspect, there is provided a computer program product comprising program instructions which, when run on a computing apparatus, cause the computing apparatus to perform at least the following: determining a spatial direction for a time interval between a first reference signal resource set in a first time slot and a second reference signal resource set in a second time slot; and transmitting one or more uplink transmissions and/or receiving one or more downlink transmissions according to the determined spatial direction during the time interval.

According to another aspect, there is provided a computer program comprising instructions for causing an apparatus to perform at least the following: determining a spatial direction for a time interval between a first reference signal resource set in a first time slot and a second reference signal resource set in a second time slot; and transmitting one or more uplink transmissions and/or receiving one or more downlink transmissions according to the determined spatial direction during the time interval.

According to another aspect, there is provided a computer readable medium comprising program instructions for causing an apparatus to perform at least the following: determining a spatial direction for a time interval between a first reference signal resource set in a first time slot and a second reference signal resource set in a second time slot; and transmitting one or more uplink transmissions and/or receiving one or more downlink transmissions according to the determined spatial direction during the time interval.

According to another aspect, there is provided a non-transitory computer readable medium comprising program instructions for causing an apparatus to perform at least the following: determining a spatial direction for a time interval between a first reference signal resource set in a first time slot and a second reference signal resource set in a second time slot; and transmitting one or more uplink transmissions and/or receiving one or more downlink transmissions according to the determined spatial direction during the time interval.

According to another aspect, there is provided an apparatus comprising at least one processor, and at least one memory including computer program code, wherein the at least one memory and the computer program code are configured, with the at least one processor, to cause the apparatus to: indicate, to a terminal device, a spatial direction for a time interval between a first reference signal resource set in a first time slot and a second reference signal resource set in a second time slot; and receive one or more uplink transmissions from the terminal device and/or transmit one or more downlink transmissions to the terminal device during the time interval.

According to another aspect, there is provided an apparatus comprising means for: indicating, to a terminal device, a spatial direction for a time interval between a first reference signal resource set in a first time slot and a second reference signal resource set in a second time slot; and receiving one or more uplink transmissions from the terminal device and/or transmitting one or more downlink transmissions to the terminal device during the time interval.

According to another aspect, there is provided a method comprising: indicating, to a terminal device, by a network element, a spatial direction for a time interval between a first reference signal resource set in a first time slot and a second reference signal resource set in a second time slot; and receiving at the network element, one or more uplink transmissions from the terminal device and/or transmitting, by the network element, one or more downlink transmissions to the terminal device during the time interval.

According to another aspect, there is provided a computer program comprising instructions for causing an apparatus to perform at least the following: indicating, to a terminal device, a spatial direction for a time interval between a first reference signal resource set in a first time slot and a second reference signal resource set in a second time slot; and receiving one or more uplink transmissions from the terminal device and/or transmitting one or more downlink transmissions to the terminal device during the time interval.

According to another aspect, there is provided a computer program product comprising program instructions which, when run on a computing apparatus, cause the computing apparatus to perform at least the following: indicating, to a terminal device, a spatial direction for a time interval between a first reference signal resource set in a first time slot and a second reference signal resource set in a second time slot; and receiving one or more uplink transmissions from the terminal device and/or transmitting one or more downlink transmissions to the terminal device during the time interval.

According to another aspect, there is provided a computer readable medium comprising program instructions for causing an apparatus to perform at least the following: indicating, to a terminal device, a spatial direction for a time interval between a first reference signal resource set in a first time slot and a second reference signal resource set in a second time slot; and receiving one or more uplink transmissions from the terminal device and/or transmitting one or more downlink transmissions to the terminal device during the time interval.

According to another aspect, there is provided a non-transitory computer readable medium comprising program instructions for causing an apparatus to perform at least the following: indicating, to a terminal device, a spatial direction for a time interval between a first reference signal resource set in a first time slot and a second reference signal resource set in a second time slot; and receiving one or more uplink transmissions from the terminal device and/or transmitting one or more downlink transmissions to the terminal device during the time interval.

According to another aspect, there is provided a system comprising at least a terminal device and a network element of a wireless communication network. The terminal device is configured to: determine a spatial direction for a time interval between a first reference signal resource set in a first time slot and a second reference signal resource set in a second time slot; and transmit one or more uplink transmissions and/or receive one or more downlink transmissions according to the determined spatial direction during the time interval. The network element is configured to: receive the one or more uplink transmissions and/or transmit the one or more downlink transmissions during the time interval.

According to another aspect, there is provided a system comprising at least a terminal device and a network element of a wireless communication network. The terminal device comprises means for: determining a spatial direction for a time interval between a first reference signal resource set in a first time slot and a second reference signal resource set in a second time slot; and transmitting one or more uplink transmissions and/or receiving one or more downlink transmissions according to the determined spatial direction during the time interval. The network element comprises means for: receiving the one or more uplink transmissions and/or transmitting the one or more downlink transmissions during the time interval.

BRIEF DESCRIPTION OF THE DRAWINGS

In the following, various exemplary embodiments will be described in greater detail with reference to the accompanying drawings, in which

FIGS. 7-8 illustrate flow charts according to some exemplary embodiments;

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplary embodiments will be described using, as an example of an access architecture to which the exemplary embodiments may be applied, a radio access architecture based on long term evolution advanced (LTE Advanced, LTE-A) or new radio (NR, 5G), without restricting the exemplary embodiments to such an architecture, however. It is obvious for a person skilled in the art that the exemplary embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, substantially the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
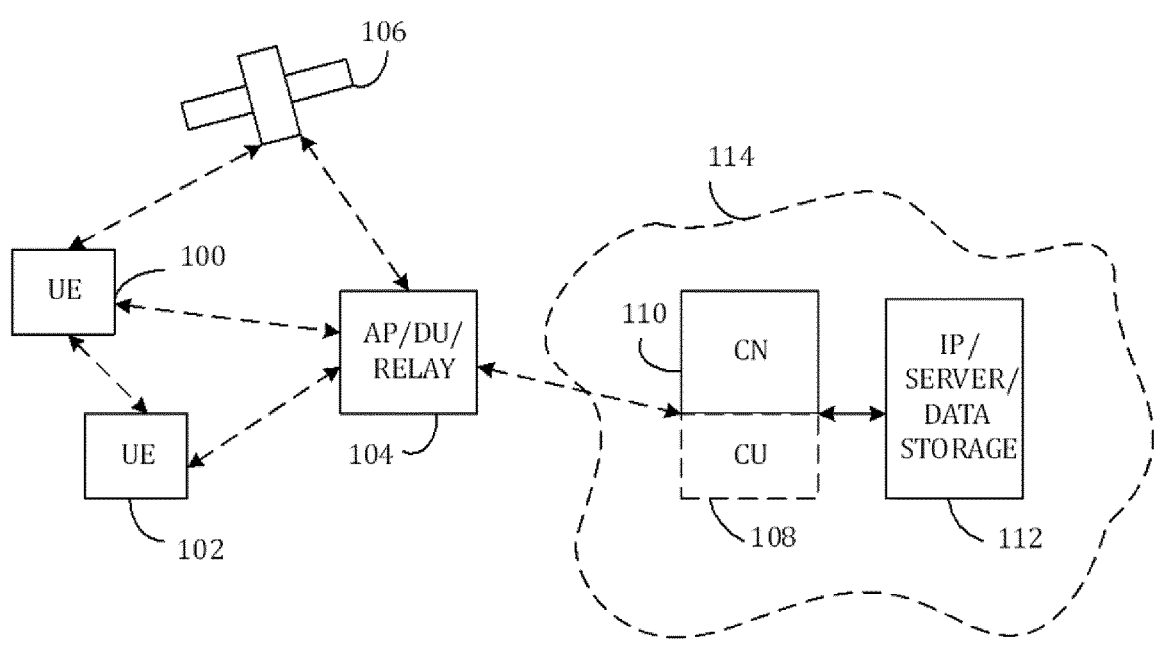
FIG. 1 illustrates an exemplary embodiment of a cellular communication network.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The exemplary embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g) NodeB) 104 providing the cell. The physical link from a user device to a (e/g) NodeB may be called uplink or reverse link and the physical link from the (e/g) NodeB to the user device may be called downlink or forward link. It should be appreciated that (e/g) NodeBs or their functionalities may be implemented by using any node, host, server or access point etc. entity suitable for such a usage.

A communication system may comprise more than one (e/g) NodeB, in which case the (e/g) NodeBs may also be configured to communicate with one another over links, wired or wireless, designed for the purpose. These links may be used for signaling purposes. The (e/g) NodeB may be a computing device configured to control the radio resources of communication system it is coupled to. The (e/g) NodeB may also be referred to as a base station, an access point or any other type of interfacing device including a relay station capable of operating in a wireless environment. The (e/g) NodeB may include or be coupled to transceivers. From the transceivers of the (e/g) NodeB, a connection may be provided to an antenna unit that establishes bi-directional radio links to user devices. The antenna unit may comprise a plurality of antennas or antenna elements. The (e/g) NodeB may further be connected to core network 110 (CN or next generation core NGC). Depending on the system, the counterpart on the CN side may be a serving gateway (S-GW, routing and forwarding user data packets), packet data network gateway (P-GW) for providing connectivity of user devices (UEs) to external packet data networks, mobility management entity (MME), access and mobility management function (AMF), or location management function (LMF), etc.

The user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node may be a layer 3 relay (self-backhauling relay) towards the base station. The self-backhauling relay node may also be called an integrated access and backhaul (IAB) node. The IAB node may comprise two logical parts: a mobile termination (MT) part, which takes care of the backhaul link(s) (i.e., link(s) between IAB node and a donor node, also known as a parent node) and a distributed unit (DU) part, which takes care of the access link(s), i.e., child link(s) between the IAB node and UE(s) and/or between the IAB node and other IAB nodes (multi-hop scenario).

The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation may be carried out in the cloud. The user device (or in some exemplary embodiments a layer 3 relay node) may be configured to perform one or more of user equipment functionalities. The user device may also be called a subscriber unit, mobile station, remote terminal, access terminal, user terminal, terminal device, or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may be expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave, below 6 GHz-cmWave-mmWave). One of the concepts considered to be used in 5G networks may be network slicing in which multiple independent and dedicated virtual sub-networks (network instances) may be created within the substantially same infrastructure to run services that have different requirements on latency, reliability, throughput and mobility.

The current architecture in LTE networks may be fully distributed in the radio and fully centralized in the core network. The low latency applications and services in 5G may need to bring the content close to the radio which leads to local break out and multi-access edge computing (MEC). 5G may enable analytics and knowledge generation to occur at the source of the data. This approach may need leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head (RRH) or a radio unit (RU), or a base station comprising radio parts. It may also be possible that node operations will be distributed among a plurality of servers, nodes or hosts. Carrying out the RAN real-time functions at the RAN side (in a distributed unit, DU 104) and non-real time functions in a centralized manner (in a central unit, CU 108) may be enabled for example by application of cloudRAN architecture.

It should also be understood that the distribution of labour between core network operations and base station operations may differ from that of the LTE or even be non-existent. Some other technology advancements that may be used may be Big Data and all-IP, which may change the way networks are being constructed and managed. 5G (or new radio, NR) networks may be designed to support multiple hierarchies, where MEC servers may be placed between the core and the base station or nodeB (gNB). It should be appreciated that MEC may be applied in 4G networks as well.

5G may also utilize satellite communication to enhance or complement the coverage of 5G service, for example by providing backhauling. Possible use cases may be providing service continuity for machine-to-machine (M2M) or Internet of Things (IoT) devices or for passengers on board of vehicles, or ensuring service availability critical for communications, and future railway/maritime/aeronautical communications. Satellite communication may utilize geostationary earth orbit (GEO) satellite systems, but also low earth orbit (LEO) satellite systems, in particular megaconstellations (systems in which hundreds of (nano) satellites are deployed). At least one satellite 106 in the megaconstellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g) NodeBs, the user device may have an access to a plurality of radio cells and the system may also comprise other apparatuses, such as physical layer relay nodes or other network elements, etc. At least one of the (e/g) NodeBs or may be a Home (e/g) nodeB.

Furthermore, the (e/g) nodeB or base station may also be split into: a radio unit (RU) comprising a radio transceiver (TRX), i.e., a transmitter (Tx) and a receiver (Rx); one or more distributed units (DUs) that may be used for the so-called Layer 1 (L1) processing and real-time Layer 2 (L2) processing; and a central unit (CU) or a centralized unit that may be used for non-real-time L2 and Layer 3 (L3) processing. The CU may be connected to the one or more DUs for example by using an F1 interface. Such a split may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU may be defined as a logical node hosting higher layer protocols, such as radio resource control (RRC), service data adaptation protocol (SDAP) and/or packet data convergence protocol (PDCP), of the (e/g) nodeB or base station. The DU may be defined as a logical node hosting radio link control (RLC), medium access control (MAC) and/or physical (PHY) layers of the (e/g) nodeB or base station. The operation of the DU may be at least partly controlled by the CU. The CU may comprise a control plane (CU-CP), which may be defined as a logical node hosting the RRC and the control plane part of the PDCP protocol of the CU for the (e/g) nodeB or base station. The CU may further comprise a user plane (CU-UP), which may be defined as a logical node hosting the user plane part of the PDCP protocol and the SDAP protocol of the CU for the (e/g) nodeB or base station.

Cloud computing platforms may also be used to run the CU and/or DU. The CU may run in a cloud computing platform, which may be referred to as a virtualized CU (vCU). In addition to the vCU, there may also be a virtualized DU (vDU) running in a cloud computing platform. Furthermore, there may also be a combination, where the DU may use so-called bare metal solutions, for example application-specific integrated circuit (ASIC) or customer-specific standard product (CSSP) system-on-a-chip (SoC) solutions. It should also be understood that the distribution of labour between the above-mentioned base station units, or different core network operations and base station operations, may differ.

Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The (e/g) NodeBs of FIG. 1 may provide any kind of these cells. A cellular radio system may be implemented as a multilayer network including several kinds of cells. In multilayer networks, one access node may provide one kind of a cell or cells, and thus a plurality of (e/g) NodeBs may be needed to provide such a network structure.

For fulfilling the need for improving the deployment and performance of communication systems, the concept of "plug-and-play" (e/g) NodeBs may be introduced. A network which may be able to use "plug-and-play" (e/g) NodeBs, may include, in addition to Home (e/g) NodeBs (H (e/g) nodeBs), a home node B gateway, or HNB-GW (not shown in FIG. 1). A HNB Gateway (HNB-GW), which may be installed within an operator's network, may aggregate traffic from a large number of HNBs back to a core network.

In wireless communication systems, information may be transmitted via a radio channel. The effect of the channel on the transmitted signal may need to be estimated in order to recover the transmitted data. For example, with binary phase shift keying (BPSK), binary information is represented as +1 and −1 symbol values. The radio channel may apply a phase shift to the transmitted symbols, possibly inverting the symbol values. As long as the receiver can estimate what the channel did to the transmitted signal, it can accurately recover the data comprised in the signal.

Reference signals (RS), which may also be referred to as pilots, may be transmitted along with the data in order to obtain channel state information knowledge for proper decoding of received signals. Reference signals are predefined signals that are known at both the transmitter and receiver. Thus, the receiver can estimate the effect of the channel by comparing the received reference signal with the original reference signal known at the receiver. Reference signals may be used in both downlink (DL) and uplink (UL) for example for obtaining accurate channel knowledge in order to derive channel state information (CSI), for demodulating data, for allowing the receiver to perform fine time and frequency channel tracking, for UL/DL beam management, for UL/DL scheduling purposes, and/or for interference estimation in UL/DL.

For example, the following reference signals may be used in NR: demodulation reference signal (DM-RS), phase-tracking reference signal (PT-RS), non-zero power (NZP) channel state information reference signal (CSI-RS), synchronization signal block (SSB), and sounding reference signal (SRS).

DM-RS may be used by a receiver to estimate the radio channel for demodulation of the associated physical channel. DM-RS design and resource mapping may be specific to a given DL or UL NR channel, such as a physical broadcast channel (PBCH), physical downlink control channel (PDCCH), physical downlink shared channel (PDSCH), physical uplink control channel (PUCCH), or physical uplink shared channel (PUSCH). DM-RS may be specific for a given UE, and transmitted on demand. The system can precode and/or beamform the DM-RS, keep it within a scheduled resource, and transmit it when necessary in either downlink or uplink. Additionally, multiple orthogonal DM-RSs can be allocated to support MIMO transmission. The network may present UEs with DM-RS information early on for the initial decoding requirement that low-latency applications may need, but it may only occasionally present this information for low-speed scenarios, in which the channel shows little change. In high-mobility scenarios to track fast changes in the channel, it may increase the rate of transmission of the DM-RS signal (called "additional DM-RS").

PT-RS may be used to track the phase of the local oscillator at the transmitter and/or receiver. The phase noise of a transmitter increases as the frequency of operation increases. One of the main problems that phase noise introduces into an orthogonal frequency-division multiplexing (OFDM) signal appears as a common phase rotation of the sub-carriers, known as the common phase error (CPE). PT-RS enables suppression of phase noise and CPE for example at higher mmWave frequencies. PT-RS may be present both in the uplink and downlink data channels (i.e. PUSCH and PDSCH). The presence as well as the time and frequency domain density of the PT-RS is a function of the modulation and coding scheme (MCS), and the allocation bandwidth of the PUSCH and PDSCH. Due to phase noise properties, PT-RS has a low density in the frequency domain and a high density in the time domain. The density in the frequency domain is a function of the allocation bandwidth, and the density in the time domain is a function of the MCS. PT-RS may be associated with one DM-RS port during transmission. Moreover, PT-RS may be confined to the scheduled bandwidth and the duration used for PDSCH and PUSCH. The system may map the PT-RS information to a few subcarriers per symbol, because the phase rotation affects the sub-carriers with an OFDM symbol equally, but shows low correlation from symbol to symbol.

CSI-RS is a downlink signal. The CSI-RS that a UE receives is used to estimate the channel and report channel quality information back to the base station. For example, the CSI-RS may be used for reference signal received power (RSRP) measurements during mobility and beam management. CSI-RS may also be used for frequency and/or time tracking, demodulation, and UL channel reciprocity-based precoding. CSI-RS may be configured specific to a given UE, but multiple UEs may also share the same resource. 5G NR allows a high level of flexibility in CSI-RS configurations, and a resource can be configured with up to 32 ports, for example. A CSI-RS resource may start at any OFDM symbol of the slot and it may occupy, for example, 1, 2 or 4 OFDM symbols depending on the configured number of ports. CSI-RS may be periodic, semi-persistent, or aperiodic due to downlink control information (DCI) triggering. For time and/or frequency tracking, CSI-RS can be periodic or aperiodic. It may be transmitted in bursts of two or four symbols, which may be spread across one or two slots. The time and/or frequency tracking CSI-RS may also be called a tracking reference signal (TRS). During MIMO operations, NR may use different antenna approaches based on the carrier frequency. At lower frequencies, the system may use a modest number of active antennas for multi-user MIMO (MU-MIMO) and adds frequency-division duplexing (FDD) operations. In this case, the UE may use the CSI-RS to calculate the CSI and report it back in the uplink direction.

SSB may be used for beam management. To enable a UE to find a cell while entering a system, as well as to find new cells when moving within the system, a synchronization signal comprising a primary synchronization signal (PSS) and a secondary synchronization signal (SSS) may be periodically transmitted on the downlink from a given NR cell. Thus, the PSS and SSS along with PBCH can be jointly referred to as the SSB. The synchronization is a process, in which the UE obtains the time and frequency information of the wireless network in order for the UE to access the network.

SRS is an uplink reference signal that may be transmitted by a UE for example to assist a base station to obtain the CSI for the UE. CSI describes how the transmitted signal from the UE to the base station is impacted by a channel, and it represents the combined effect of scattering, fading, power decay, time delay and Doppler spread and/or Doppler shift. Furthermore, the channel may also cover implementation-specific impacts at a transmitter and/or receiver, such as a frequency offset due to oscillator drifting at the transmitter and/or receiver. The system may use the SRS for resource scheduling, link adaptation, positioning, massive MIMO, and/or beam management. The SRS may be configured specific to a given UE. In NR Release 15, in the time domain, SRS may span 1, 2 or 4 consecutive symbols, which may be mapped within the last six symbols of the slot. In NR Release 17, the time-span of UL SRS can be up to 14 symbols (covering also options e.g. up to 8, 10 and 12 symbols). Multiple SRS symbols allow coverage extension and increased sounding capacity.

NR Release 15 (Rel-15) can operate with a beam-based mode, both below and above the 6 GHz carrier frequency range, where both transmitter and receiver use spatial domain beamforming (e.g., in analog or digital domain) at TX and/or RX to cover a propagation loss associated with a radio channel. UEs may be equipped with multiple reception (RX) antenna panels associated with multiple antenna elements. Depending on the UE reception capability, a set of UE antenna panels may be simultaneously used for reception.

A parameter called simultaneousReceptionDiffTypeD-r16 may indicate whether the UE supports simultaneous reception with different quasi co-location (QCL) type D reference signals. In NR Release 17 (Rel-17), both DL and UL transmission schemes for reference signals, other signals, and channels may be enhanced to enable more flexible and efficient support for multiple transmission and reception point (multi-TRP) operation.

NR Rel-15 provides support for single-user DL PDSCH scheduling for up to 8 layers (i.e., rank 8). However, Rel-15 UL SRS resource configuration with antenna switching can provide support for UEs equipped with up to 4 RX antenna ports. In other words, even though a UE may be equipped for example with 8 RX antenna ports, in NR Rel-15 just 4 out of the 8 antenna ports can be used for DL CSI acquisition at gNB-based UL SRS sounding. This may lead to suboptimal use of DL TX precoding as well as RX processing, thus limiting system performance for example in terms of spectral efficiency and interference mitigation.

Although a UE may comprise, for example, 4 or 8 RX antennas, the number of its uplink transmission (TX) antennas may be smaller, since UL transmission may be more power-limited than DL transmission, and it may be more efficient to not increase the number of layers per UE in power-limited conditions. Furthermore, adding TX radio frequency (RF) chains to the UE may cause several implementation issues, such as excessive UE power drainage, and placement overlaps for example with cameras and sensors in smart phones. A single TX RF chain may be connected to one of the RX antennas through a switch when it transmits SRS. This switch may be used to switch the TX RF chain between the different RX antennas in order to alternate the transmission of SRS from different antennas. This switching may be referred to as antenna switching. A UE may transmit an individual SRS for each receive antenna, and the base station (e.g., gNB) is then able to construct a channel matrix from the received SRS responses. The base station can decide the best precoder and/or beamforming weights to maximize DL capacity without quantization error, as long as the received quality of SRS is high enough.

In NR Rel-15, depending on the reported UE antenna-switching capability, the UE can be configured with one of the following antenna-switching configurations, where T defines the number of transmission antenna ports and R defines the number of reception antenna ports at the UE side (herein antenna port refers to a logical antenna port). The indicated UE antenna switching capability of 'xTyR' corresponds to a UE capable of SRS transmission on 'x' antenna ports over a total of 'y' antennas, where 'y' corresponds to all or a subset of the UE receive antennas.

'tlr2' for 1T2R (i.e. one transmission antenna port and two reception antenna ports), 'tlr1-tlr2' for 1T=1R/1T2R (i.e. one transmission antenna port and one or two reception antenna ports), 't2r4' for 2T4R (i.e. two transmission antenna ports and four reception antenna ports), 'tlr4' for 1T4R (i.e. one transmission antenna port and four reception antenna ports), 'tlr1-tlr2-tlr4' for 1T=1R/1T2R/1T4R (i.e. one transmission antenna port and one, two or four reception antenna ports), 'tlr4-t2r4' for 1T4R/2T4R (i.e. one or two transmission antenna ports and four reception antenna ports), 'tlr1-tlr2-t2r2-t2r4' for 1T=1R/1T2R/2T=2R/2T4R (i.e. one transmission antenna port and one reception antenna port, or one transmission antenna port and two reception antenna ports, or two transmission antenna ports and two reception antenna ports, or two transmission antenna ports and four reception antenna ports), 'tlr1-tlr2-t2r2-tlr4-t2r4' for 1T=1R/1T2R/2T=2R/1T4R/2T4R (i.e. one transmission antenna port and one reception antenna port, or one transmission antenna port and two reception antenna ports, or two transmission antenna ports and two reception antenna ports, or one transmission antenna ports and four reception antenna ports, or two transmission antenna ports and four reception antenna ports), 'tlr1' for 1T=1R (i.e. one transmission antenna port and one reception antenna port), 't2r2' for 2T=2R (i.e. two transmission antenna ports and two reception antenna ports), 'tlr1-t2r2' for 1T=1R/2T=2R (i.e. one transmission antenna port and one reception antenna port, or two transmission antenna ports and two reception antenna ports), 't4r4' for 4T=4R (i.e. four transmission antenna ports and four reception antenna ports), or 'tlr1-t2r2-t4r4' for 1T=1R/2T=2R/4T=4R (i.e. one transmission antenna port and one reception antenna port, or two transmission antenna ports and two reception antenna ports, or four transmission antenna ports and four reception antenna ports).

NR Rel-15 provides support for resource-specific repetition, where one UL SRS resource can be repeated in up to 4 symbols (including also repetition of 2 symbols). The SRS resource can be configured into 1 or 2 or 4 of the last 6 symbols in a slot. Furthermore, NR Rel-15 supports UL SRS resource configuration with intra-slot frequency domain hopping with repetition, where the same set of subcarriers is to be sounded in consecutive 2 or 4 OFDM symbols within a slot before the next frequency hop occurs.

NR Rel-15 supports the following SRS time domain behaviors: periodic, semi-persistent, and aperiodic transmissions. With semi-persistent SRS transmission, MAC control elements (CEs) are used to activate and deactivate a semi-persistent set of one or more SRS resources. While activated, a semi-persistent SRS resource is transmitted with a configured periodicity and slot offset. This MAC CE activation/deactivation mechanism enables more dynamic on/off control compared to periodic SRS resources, which are configured by RRC signaling.

In NR Rel-15, a given UE may be configured with a UL SRS antenna-switching resource configuration as follows:

For 1T2R, up to two SRS resource sets may be configured with a different value for the higher layer parameter resourceType in the SRS-ResourceSet set, where each set has two SRS resources transmitted in different symbols, each SRS resource in a given set consisting of a single SRS port, and the SRS port of the second resource in the set is associated with a different UE antenna port than the SRS port of the first resource in the same set.

For 2T4R, up to two SRS resource sets may be configured with a different value for the higher layer parameter resourceType in the SRS-ResourceSet set, where each SRS resource set has two SRS resources transmitted in different symbols, each SRS resource in a given set consisting of two SRS ports, and the SRS port pair of the second resource is associated with a different UE antenna port pair than the SRS port pair of the first resource.

For 1T4R, zero or one SRS resource set may be configured with the higher layer parameter resourceType in the SRSResourceSet set to 'periodic' or 'semi-persistent' with four SRS resources transmitted in different symbols, each SRS resource in a given set consisting of a single SRS port, and the SRS port of each resource is associated with a different UE antenna port.

For 1T4R, zero or two SRS resource sets may be configured with the higher layer parameter resourceType in the SRSResourceSet set to 'aperiodic' and with a total of four SRS resources transmitted in different symbols of two different slots, and where the SRS port of each SRS resource in the given two sets is associated with a different UE antenna port.

For 1T=1R, or 2T=2R, or 4T=4R, up to two SRS resource sets may be configured, each with one SRS resource, where the number of SRS ports for each resource may be equal to 1, 2, or 4.

NR Rel-17 may specify enhanced mechanisms for UL SRS to enable more flexible triggering on aperiodic SRS sets, for example by specifying SRS switching for up to 8 antenna ports. In NR Rel-17, for example the following additional antenna-switching configurations may be supported: 1T6R, 1T8R, 2T6R, 2T8R and 4T8R.

To enable enhanced system performance, as discussed above, NR Rel-17 further enhanced MIMO (FeMIMO) may provide support for UL SRS antenna-switching configurations with 6 and 8 UE RX antenna ports, for example xT6R and xT8R.

In the following, some different alternatives for the maximum number of aperiodic UL SRS resource sets (N_max) in Rel-17 are presented: 1T6R: N_max=3, 1T8R: N_max=4, 2T6R: N_max=3, 2T8R: N_max=4, 4T8R: N_max=2.

From a network perspective, the above alternatives may be useful for enabling a larger number of different UL SRS antenna switching configurations compared with Rel-15 (up to N_max=2). By enabling support for a larger number of resource sets, UL SRS transmissions can be distributed more flexibly across different slots. Otherwise, UL SRS resource transmissions may severely restrict UL resource utilization for PUSCH and PUCCH transmissions.

Figure 2:
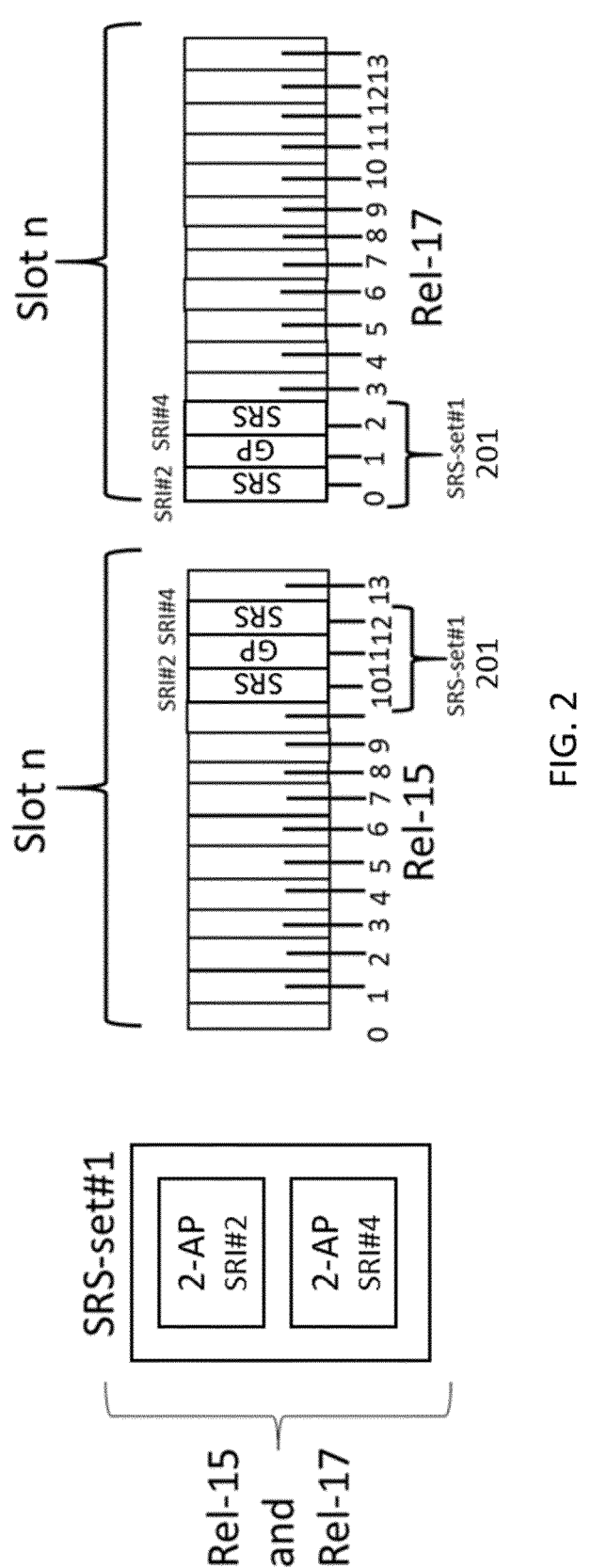
FIGS. 2-6 illustrate examples of uplink sounding reference signal resource configurations.

FIG. 2 illustrates an example of UL SRS antenna-switching with NR Rel-15 and NR Rel-17 resource configurations for two transmission antenna ports and four reception antenna ports (2T4R). Herein one UL SRS resource set 201 (SRS-set #1) is configured with two resources, i.e., sounding reference signal indicator (SRI) #2 and #4, with two antenna ports (2-AP). It is assumed that a guard period is associated between resources within the UL SRS resource set. Furthermore, it is assumed that the UE can transmit simultaneously via both antenna ports associated with the resource. In Rel-15, UL SRS resources can be configured into up to four out of the last six symbols in a slot. In comparison, Rel-17 enables to configure UL resources into any symbol position in the slot.

Table 1 below shows the minimum guard periods (GP) between two SRS resources of an SRS resource set according to NR Rel-15. The guard period is a time period, which may also be referred to as a guard interval. Guard periods may be used to ensure that distinct transmissions do not interfere with one another, or otherwise cause overlapping transmissions.

TABLE 1

| μ | $\Delta f = 2^{\mu} \cdot 15$ [kHz] | Y [symbol] |
|---|---|---|
| 0 | 15 | 1 |
| 1 | 30 | 1 |
| 2 | 60 | 1 |
| 3 | 120 | 2 |

Figure 3:
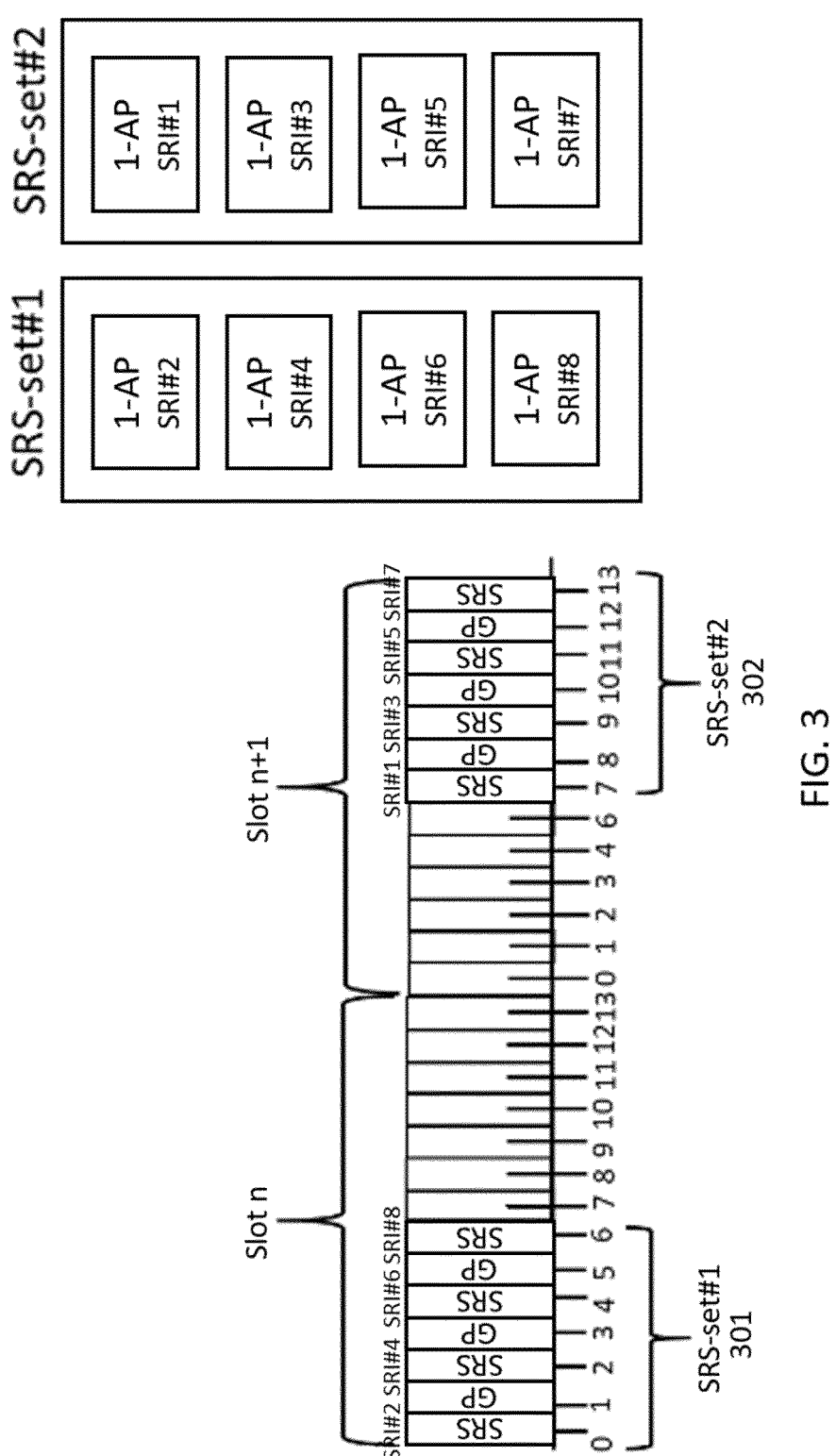

FIG. 3 illustrates an example of UL SRS resource configuration for 1T8R with 15 kHz sub-carrier spacing (SCS). In FIG. 3, two different SRS resource sets 301, 302 (SRS-set #1 and SRS-set #2) associated with different slot offset values (i.e., n and n+1) are configured for 1T8R, wherein each resource set has four different one-antenna-port (1-AP) resources associated with different symbols.

For two SRS resource sets of an xTyR antenna switching configuration located in two consecutive slots, if the UE is capable of transmitting SRS in all symbols in one slot, a minimum gap period (guard period) of Y symbols may exist between the last OFDM symbol occupied by the SRS resource set in the first slot and the first OFDM symbol occupied by the SRS resource set in the second slot. The value of Y may be the same as the inter-resource guard period defined in NR Rel-15.

However, there is currently no mechanism on how to handle the case, where the time interval between two SRS resource sets is larger than Y (guard period). In other words, NR Rel-15, Rel-16 or Rel-17 currently do not define any rule or mechanism and UE procedure to define what the UE should do (ambiguity problem) within the time interval between two SRS resource sets, when the time interval is larger than the guard period between two consecutive slots, where different UL SRS resource sets for antenna switching are configured.

Figure 4:
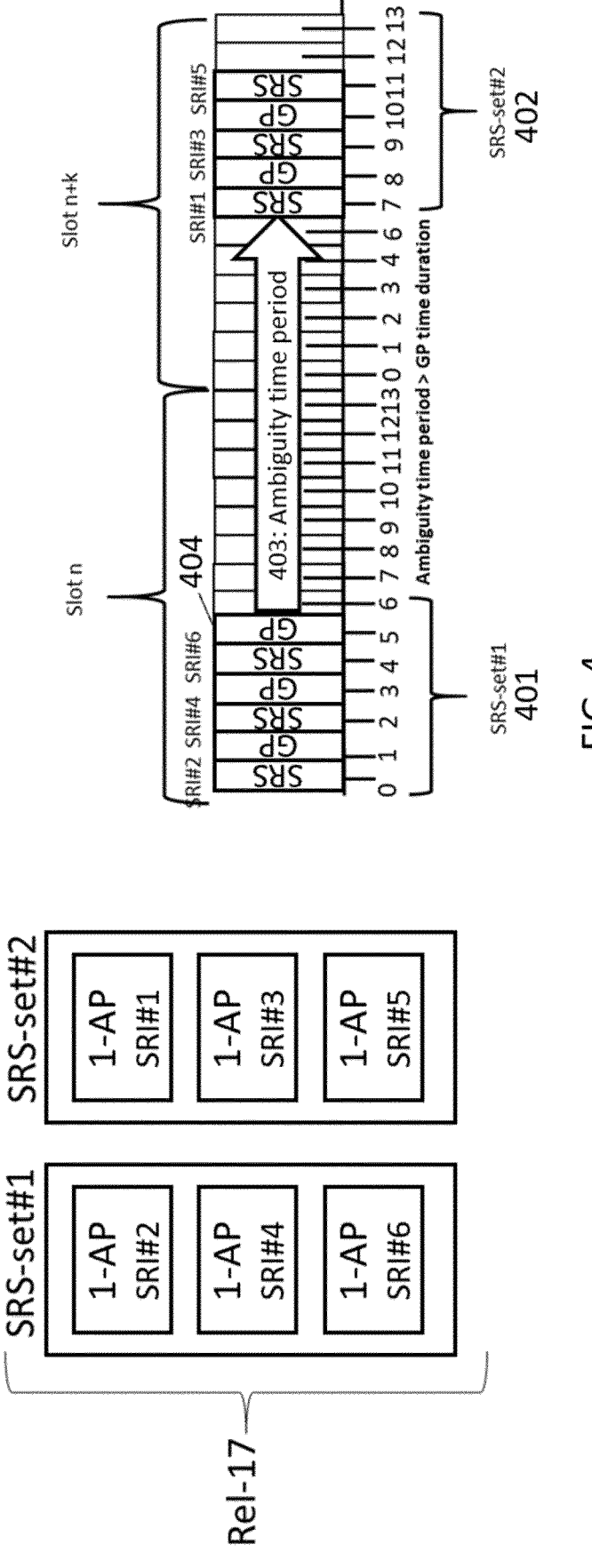

FIG. 4 illustrates an example of this ambiguity time period problem for 1T6R SRS antenna switching. Herein six one-antenna-port (1-AP) UL SRS resources (i.e., SRI #1, SRI #2, SRI #3, etc.) are configured over two consecutive time slots (k=1). When the time interval 403 between two different UL SRS resource sets 401, 402 for antenna switching is larger than the guard period 404, the ambiguity problem arises for the UE. If the UE does not have any procedure or rule defined for this case, the network cannot configure/schedule any UL or DL transmissions (resulting in interruption, i.e., not possible to schedule any UL/DL transmissions, for the UE) for the time interval 403 between two UL SRS resource sets in two consecutive slots. This may restrict efficient use of UL and/or DL resources, as well as result in a suboptimal system performance.

Thus, there is a need to provide a mechanism/rule and UE procedure for what the UE is assumed to do, when the time interval between two UL SRS resource sets for antenna switching associated with two consecutive time slots is larger than the guard period(s) (subject to numerology) between resources within a given UL SRS resource set for antenna switching Some exemplary embodiments may provide a mechanism and UE procedure to handle the case, where the time interval between two SRS resource sets is larger than the guard period.

Some exemplary embodiments are related to NR physical layer design for MIMO enhancements in NR Rel-17 and beyond. Some exemplary embodiments may enhance UL and/or DL radio resource utilization for a time interval between two UL SRS sets for antenna switching, when the time interval is larger than the guard period(s).

Some exemplary embodiments may provide an indication mechanism for spatial relation or DL transmission configuration indicator (TCI) state or joint DL/UL TCI state or UL TCI state, i.e., QCL-typeD information for transmission of UL resource(s) and/or reception of DL resource(s) (e.g., reference signal, signal, or channel) for a time interval between a guard period after the last UL SRS resource of the first UL SRS resource set for antenna switching and the first resource of the second UL SRS resource set for the antenna switching in a consecutive slot.

Moreover, some exemplary embodiments may provide an indication mechanism for spatial relation or DL TCI state or joint DL/UL TCI state or UL TCI, i.e., QCL-typeD information for transmission of UL resource(s) and/or reception of DL resource(s) (e.g., reference signal, signal, or channel) for a time interval between the last resource of the first UL SRS resource set for antenna switching and the guard period before the first resource of the second UL SRS resource set for antenna switching in a consecutive slot.

In one exemplary embodiment, the time-domain location of the guard period indicates implicitly, for the UE, spatial relation or DL TCI state or joint DL/UL TCI state or UL TCI state, i.e., the spatial QCL-typeD information for one or more UL and/or DL transmission resources for a time interval (e.g., in symbols) between the guard period after the last SRS resource of the first UL SRS resource set for antenna switching (in the slot #n or slot n+1) and the first SRS resource of the second UL SRS resource set for antenna switching associated with slot n+1. Herein the term "slot" refers to a time slot. It is worth noting that the implicit indication is valid, when DL and/or UL resource(s) scheduled/configured for the time interval between the aforementioned UL SRS resource sets for antenna switching do not have spatial relation or DL TCI state or joint DL/UL TCI state or UL TCI state configured or indicated.

During the guard period located after the last UL SRS resource of the first UL SRS resource set, the UE may switch from the spatial relation or DL TCI state or joint DL/UL TCI state or UL TCI state, i.e., QCL-typeD information, configured for transmission of the first UL SRS resource set to a spatial relation or joint DL/UL TCI state or UL TCI state, i.e, QCL-typeD information, configured for the transmission of the second UL SRS resource set in the consecutive slot. Herein, the switching of the QCL-typeD information may result in switching at least one of: a transmission beam, a receive beam, a transmission antenna panel, and/or a reception antenna panel at the UE. Additionally, it is assumed that, during the guard period, the UE is not configured/scheduled with any DL or UL transmissions.

After the guard period, the UE may be scheduled/configured (without any additional indication) to transmit with the same spatial relation, or joint DL/UL TCI state or UL TCI state, i.e., QCL-typeD information, as the second UL SRS resource set on any uplink reference signal resource, such as PTRS, DMRS, or SRS (for other usage than antenna switching, such as beam management, codebook, non-codebook, positioning), or channel (e.g., PUCCH or PUSCH) or signal (e.g., physical random-access channel preamble).

Figure 5:
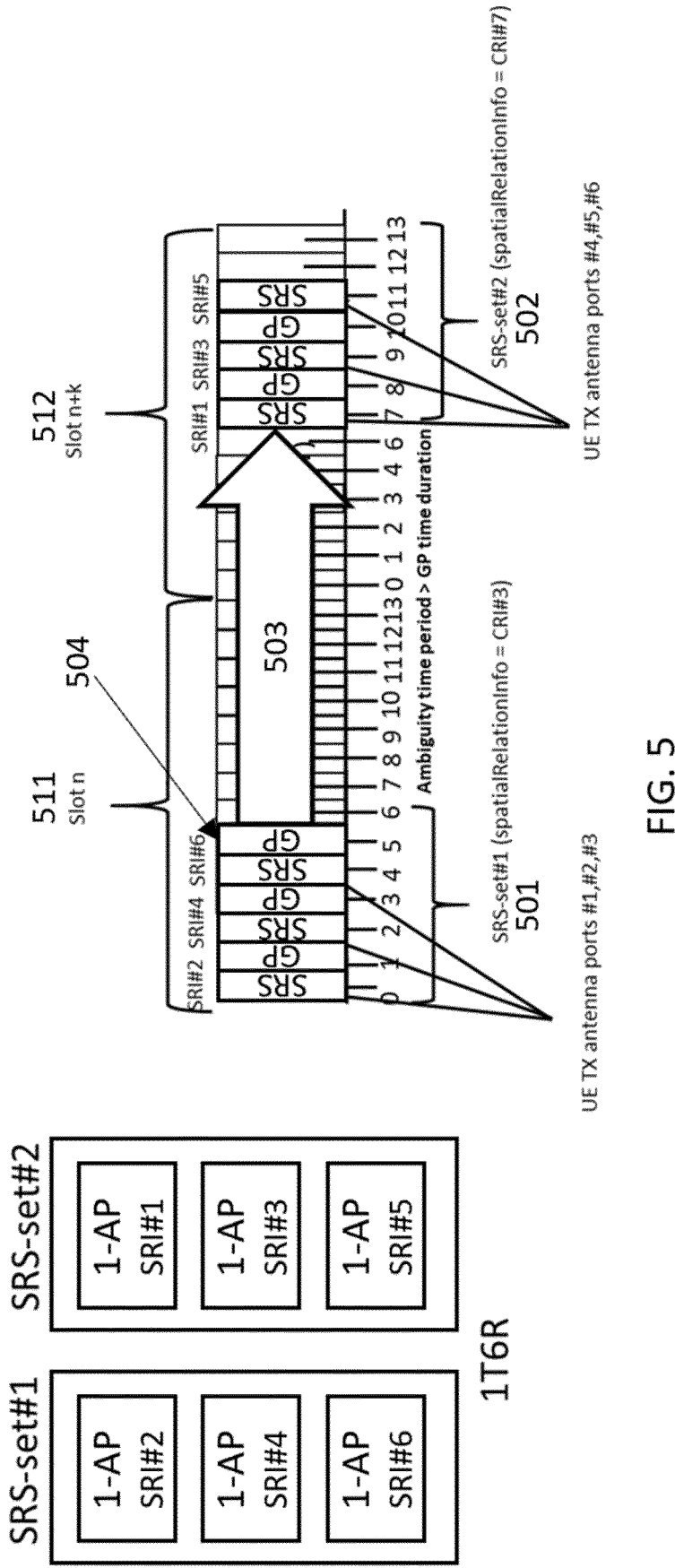

FIG. 5 illustrates an example implementation of the implicit guard period indication rule according to an exemplary embodiment. In this example, the guard period 504 is located (in time domain) after the last UL SRS resource of a first UL SRS resource set 501 (SRS-set #1) for antenna switching in a first time slot 511. In other words, the guard period 504 may be the last guard period in the first time slot 511. During the guard period 504, the UE switches its spatial relation, or joint DL/UL TCI state or UL TCI state, i.e., QCL-typeD information (indicating the spatial transmission direction from UE transmission beam and/or antenna panel) from a first spatial relation, or joint DL/UL TCI state or UL TCI state, i.e. QCL-typeD information (configured with SRS-set #1) to a second spatial relation, or joint DL/UL TCI state or UL TCI state, i.e., QCL-typeD information, (to be configured with a second UL SRS resource set 502 for antenna switching). The second UL SRS resource set 502 is located in a second time slot 512 that is consecutive to the first time slot 511.

In other words, after the guard period 504, the UE implicitly determines to use channel state information reference signal resource indicator (CRI) #7 as spatial relation information (spatialRelationInfo) for all scheduled/configured UL transmissions between the guard period 504 and the last resource of the second UL SRS resource set 502 (SRS-set #2). In this example, CRI #7 is configured as spatialRelationInfo for SRS-set #2, and CRI #3 is configured as spatialRelationInfo for SRS-set #1. Thus, CRI #7 is used as spatialRelationInfo during the time interval 503 between the first UL SRS resource set 501 and the second UL SRS resource set 502. As a result of this, the UE does not have any scheduling restrictions for any uplink resource (e.g., reference signal, channel, or signal), which uses CRI #7 as spatialRelationInfo between the guard period 504 and the last resource of the second UL SRS resource set for antenna switching.

In another exemplary embodiment, the placement of the guard period indicates implicitly, for the UE, spatial relation or DL TCI state or joint DL/UL TCI state or UL TCI state, i.e., the QCL-typeD information for one or more UL and/or DL transmission resources for a time interval (e.g., in symbols) between the last UL SRS resource of a first UL SRS resource set for antenna-switching associated with slot #n and the guard period associated with the first UL SRS resource of a second UL SRS resource set for antenna switching in a consecutive slot #(n+1).

Based on the time-domain location of the guard period, the UE may implicitly determine (without any additional indication) to use the same spatial relation or DL TCI state or joint DL/UL TCI state or UL TCI state, i.e., spatial QCL-typeD information, for any scheduled/configured UL and/or DL transmission(s) during the time interval between the last resource of the first UL SRS resource set for antenna switching and the time-domain location of the guard period associated with the first UL SRS resource of the second UL SRS resource set in the consecutive slot.

When the guard period is located before the first resource of the second UL SRS resource set, the UE may be scheduled/configured (without any additional indication) to transmit with the same spatial relation or joint DL/UL TCI state or UL TCI state, i.e. QCL-typeD information, as the first UL SRS resource set on any uplink reference signal resource, such as PTRS, DMRS, or SRS (for other usage than antenna switching, such as beam management, codebook, non-codebook, or positioning), or channel (e.g., PUCCH or PUSCH) or signal (e.g., physical random-access channel preamble). Before the guard period, the UE may also receive any configured/scheduled DL channel, reference signal, or signal with the same spatial relation or DL TCI state or joint DL/UL TCI state or UL TCI state, i.e, QCL-typeD information, as the first UL SRS resource set (without any additional indication) in a preceding slot.

During the guard period associated with the first resource of the second UL SRS resource set, the UE may switch its spatial relation or DL TCI state or joint DL/UL TCI state or UL TCI state, i.e., QCL-typeD information, to a configured spatial relation or DL TCI state or joint DL/UL TCI state or UL TCI state, i.e. QCL-typeD information, of the second UL SRS resource set for antenna switching. Herein, the switching of the QCL-typeD information may result in switching at least one of: a transmission beam, a receive beam, a transmission antenna panel, and/or a reception antenna panel at the UE. Additionally, it is assumed that, during the guard period, the UE is not configured/scheduled with any DL or UL transmissions.

Figure 6:
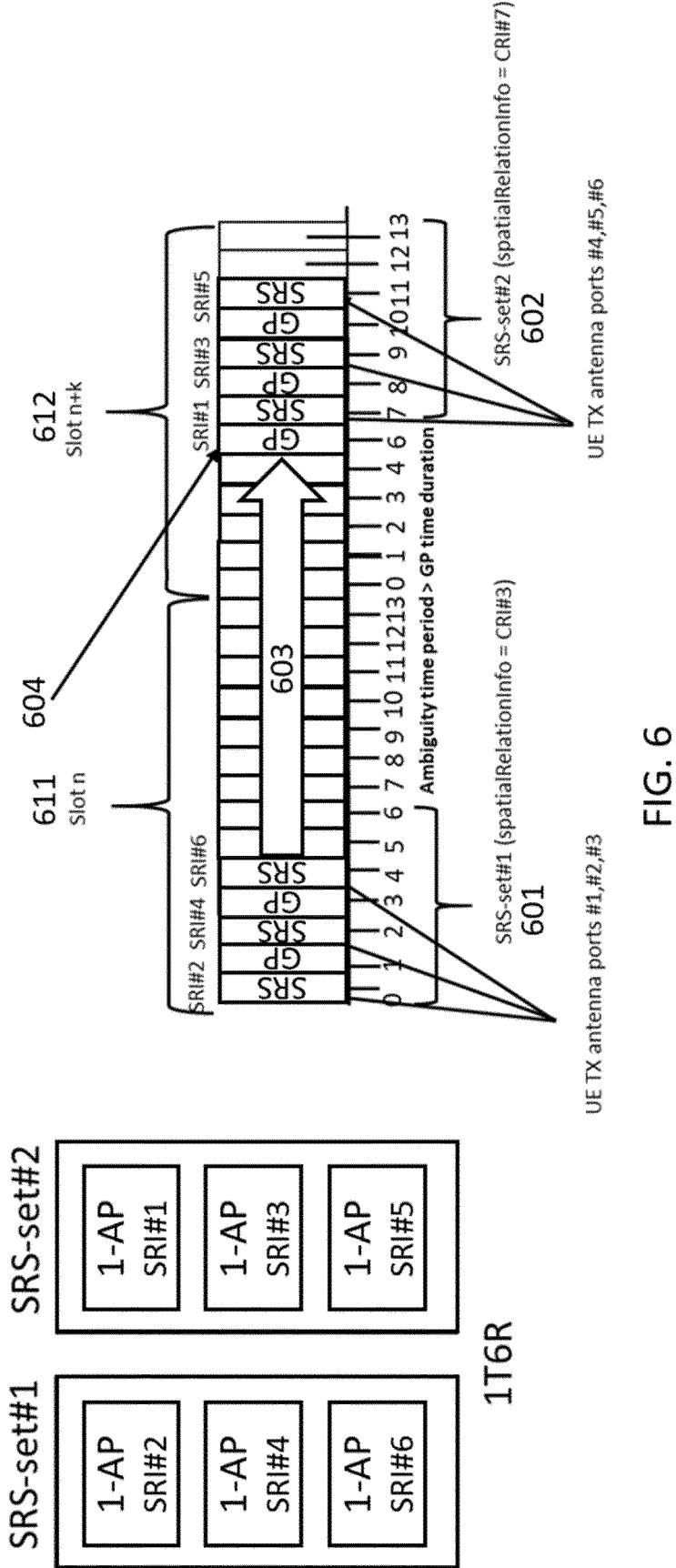

FIG. 6 illustrates another example implementation of the implicit guard period indication rule according to an exemplary embodiment. In this example, the guard period 604 is located (in time domain) directly before the first resource of the second UL SRS resource set 602 in a second time slot

612. In other words, the guard period 604 may be the first guard period in the second time slot 612. When the guard period 604 is not located after the last UL SRS resource of the first UL SRS resource set 601 in the first time slot 611 (as in FIG. 5), the UE uses the first spatial relation, state or joint DL/UL TCI state or UL TCI state, i.e., QCL-typeD information (covering spatial direction of transmission from UE transmission beam and/or antenna panel) of the first UL SRS resource set until the time-domain location of the guard period 604.

In other words, the UE implicitly determines to use CRI #3 as spatialRelationInfo for all scheduled/configured UL transmissions during the time interval 603 between the last resource of the first UL SRS resource set 601 and the guard period 604. In this example, CRI #3 is configured as spatialRelationInfo for SRS-set #1, and CRI #7 is configured as spatialRelationInfo for SRS-set #2. Moreover, the UE may assume that any DL transmission (e.g., channel, reference signal, or signal) is scheduled with the same QCL-typeD information as the first UL SRS resource set until the guard period 604.

During the guard period 604, the UE may change the spatial direction of the transmission from the UE transmission beam and/or antenna panel according to the second spatial relation or DL TCI state or joint DL/UL TCI state or UL TCI state, i.e., QCL-typeD information, of the second UL SRS resource set 602. In other words, after the guard period 604, the UE may use CRI #7 as spatialRelationInfo for all scheduled/configured UL transmissions. It is worth noting that the implicit indication is valid, when DL and/or UL resource(s) scheduled/configured for the time interval between the aforementioned UL SRS resource sets for antenna switching do not have spatial relation or DL TCI state or joint DL/UL TCI state or UL TCI state configured or indicated.

It should be noted that some exemplary embodiments are not limited to UL SRS resource sets, and they may also be applied to any other uplink reference signal resource set.

FIG. 7 illustrates a flow chart according to an exemplary embodiment. The steps illustrated in FIG. 7 may be performed by an apparatus such as, or comprised in, a terminal device. The terminal device may also be referred to as a UE or user equipment herein.

Referring to FIG. 7, in step 701, a spatial direction for a time interval between a first reference signal resource set in a first time slot and a second reference signal resource set in a second time slot is determined. The spatial direction may also be referred to as a beam direction.

The first reference signal resource set may refer to, for example, a first uplink sounding reference signal resource set (first UL SRS resource set), or any other type of uplink reference signal resource set, such as a PT-RS resource set or a DM-RS resource set. The second reference signal resource set may refer to, for example, a second uplink sounding reference signal resource set (second UL SRS resource set), or any other type of uplink reference signal resource set.

It should be noted that the terms "first reference signal resource set" and "second reference signal resource set" are used herein to distinguish the resource sets, and they do not necessarily mean a specific order or specific indices of the resource sets.

The spatial direction may be determined implicitly based at least partly on a time-domain location of a guard period. As one example, the spatial direction associated with the second reference signal resource set may be determined as the spatial direction to be used for the time interval, in response to the guard period being located after a last resource of the first reference signal resource set in the first time slot. As another example, the spatial direction associated with the first reference signal resource set may be determined as the spatial direction to be used for the time interval, in response to the guard period being located before a first resource of the second reference signal resource set in the second time slot. The first time slot and the second time slot may be consecutive time slots.

Alternatively, the spatial direction may be determined based on an explicit indication received from the network, wherein the indication explicitly indicates the spatial direction to be used for the time interval. In this case, the spatial direction for the time interval may be different than the spatial direction of the first reference signal resource set and/or the spatial direction of the second reference signal resource set.

In step 702, one or more uplink transmissions may be transmitted and/or one or more downlink transmissions may be received according to the determined spatial direction during the time interval between the first reference signal resource set and the second reference signal resource set. Thus, the UE interruption occurs only during the guard period located after the first reference signal resource set in the first time slot or before the second reference signal resource set in the second time slot. In other words, the UE is assumed to not transmit or receive anything during this guard period.

In one exemplary embodiment, a resource of an uplink reference signal or a downlink reference signal may be used as spatial relation information for either the first reference signal resource set or the second reference signal resource set, wherein the resource may also be used as spatial relation information for determining the spatial direction for transmission and/or reception during the time interval. The uplink reference signal may comprise, for example, SRS, PT-RS, DM-RS and/or any other uplink reference signal. The downlink reference signal may comprise, for example, CSI-RS, SSB, PT-RS, DM-RS and/or any other downlink reference signal. The resource of the downlink reference signal may refer to, for example, channel state information reference signal resource indicator (CRI) or synchronization signal block resource indicator (SSBRI).

FIG. 8 illustrates a flow chart according to an exemplary embodiment. The steps illustrated in FIG. 8 may be performed by an apparatus such as, or comprised in, a network element of a wireless communication network.

Referring to FIG. 8, in step 801, a spatial direction for a time interval between a first reference signal resource set in a first time slot and a second reference signal resource set in a second time slot is indicated to a terminal device.

The spatial direction may be indicated to the terminal device implicitly or explicitly. For example, a guard period may be configured to the terminal device, wherein the time-domain location of the guard period implicitly indicates the spatial direction to the terminal device. It is worth noting that the implicit indication is valid, when DL and/or UL resource(s) scheduled/configured for the time interval between the aforementioned reference signal resource sets do not have spatial relation or DL TCI state or joint DL/UL TCI state or UL TCI state configured or indicated.

In step 802, one or more uplink transmissions may be received from the terminal device, and/or one or more downlink transmissions may be transmitted to the terminal device during the time interval between the first reference signal resource set and the second reference signal resource set.

Figure 9:
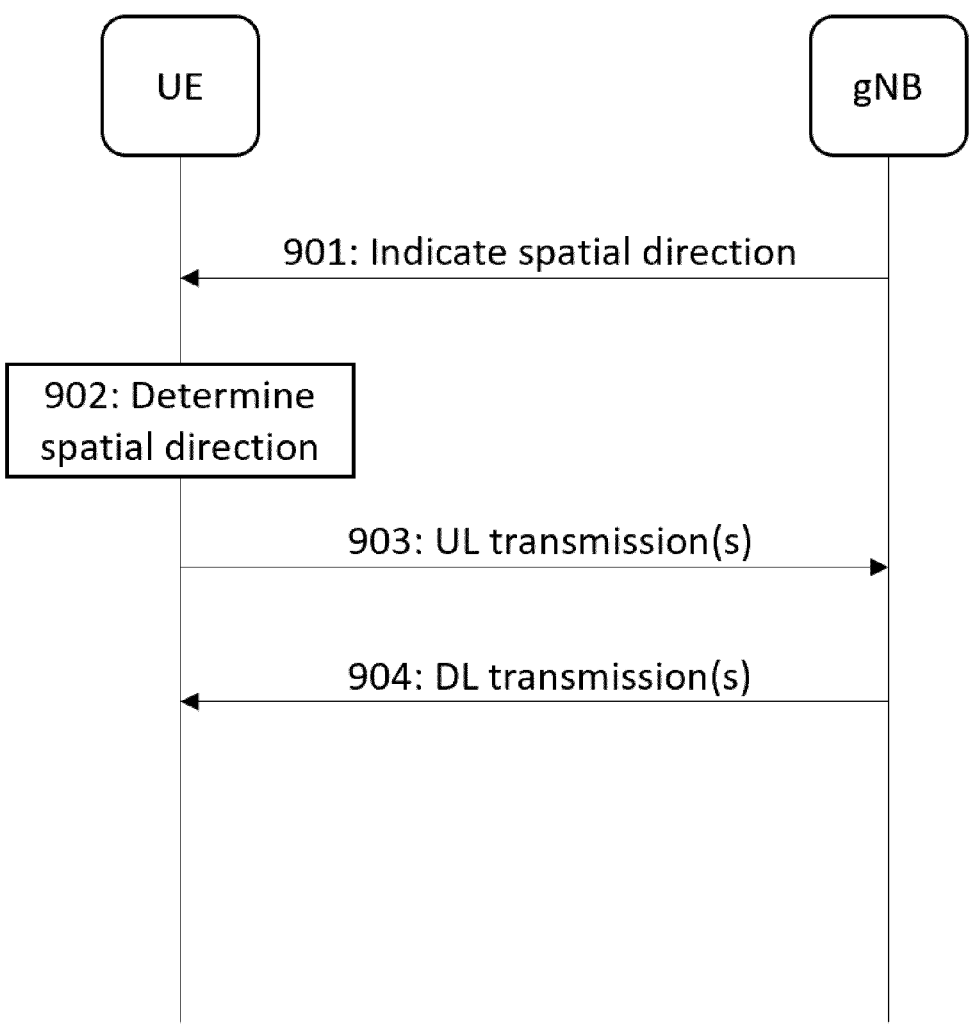
FIGS. 9-10 illustrate signaling diagrams according to some exemplary embodiments.

FIG. 9 illustrates a signaling diagram according to another exemplary embodiment, wherein the spatial direction is determined based on an explicit indication from the network.

Referring to FIG. 9, in step 901, a network element (e.g., a gNB) of a wireless communication network transmits, to a UE, receive an indication indicating a spatial direction for a time interval between a first reference signal resource set in a first time slot and a second reference signal resource set in a second time slot. The indication may be transmitted, for example, via downlink control information (DCI), MAC control element (CE), or RRC signaling.

In NR Rel-15 and NR Rel-16, spatial relation may be used to indicate the spatial direction (beam direction) in uplink, and transmission configuration indicator (TCI) state may be used to indicate the spatial direction (beam direction) in downlink.

NR Rel-17 supports joint DL/UL TCI state or UL TCI for uplink. The TCI state includes a reference signal that provides spatial relation information, based on which the UE can form the spatial TX beam direction for UL transmission. Herein, joint DL/UL TCI state may also be referred to as joint transmission configuration indicator state for downlink and uplink.

In step 902, the UE determines, based at least partly on the indication received from the network element, the spatial direction for the time interval between the first reference signal resource set and the second reference signal resource set.

In step 903, the UE may transmit one or more uplink transmissions to the network element according to the determined spatial direction during the time interval.

In step 904, the UE may receive one or more downlink transmissions from the network element according to the determined spatial direction during the time interval.

Figure 10:
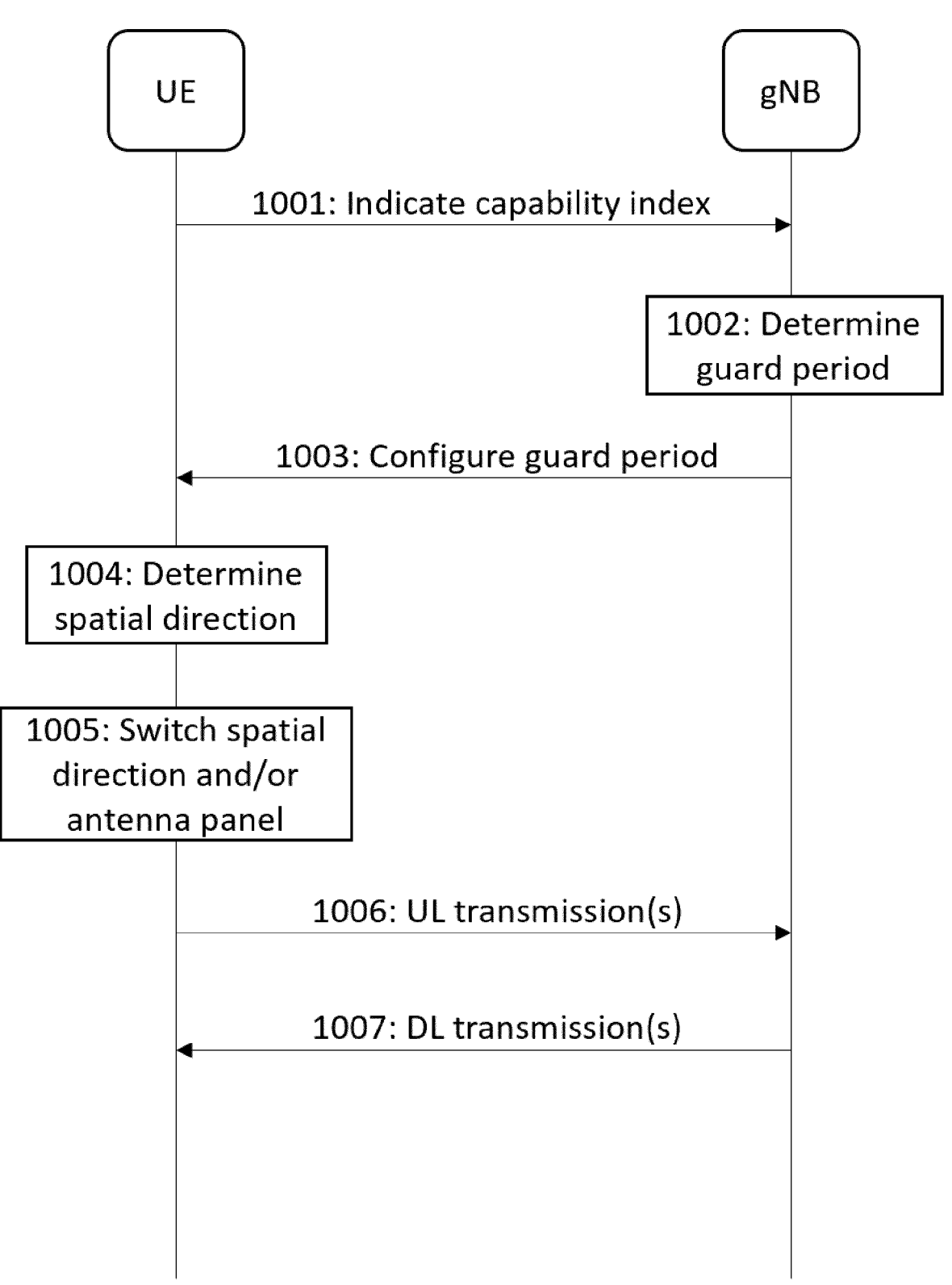

FIG. 10 illustrates a signaling diagram according to another exemplary embodiment, wherein the network may control UE TX/RX antenna panel switching by configuring the guard period into a time location, where overhead and latency for the system are minimized. The information about UE antenna panels for transmission or reception can be obtained via reporting of UE TX and/or RX capability set value with reported DL measurements. The capability set value may also be referred to as a capability index.

For example, the UE TX and/or RX capability set value may indicate a maximum number of supported SRS antenna ports, different number of supported TX/RX antenna ports, different number of TX/RX beams, different achievable effective isotropic radiated power (EIRP) and/or TX power, switch on and switch off times of TX/RX antenna panel(s), and/or switch on and switch off times of TX/RX beam(s).

More specifically, the UE is configured to measure DL CSI-RS and/or synchronization signal block (SSB) resources according to configured criteria, such as reference signal received signal power (RSRP) or layer one (L1) signal-to-interference-and-noise-ratio (SINR). Based on these measurements, the UE determines which of the capability set values (i.e., capability index) has the best correspondence between CSI-RS and/or SSB measurements. Then, the index of the corresponding UE capability set value is reported along with the pair of SSBRI/CRI and L1-RSRP/SINR (e.g., up to 4 pairs, with 7-bit absolute and 4-bit differential) in the beam reporting uplink control information (UCI). Then, the network element (e.g., gNB) can assume the reported correspondence is valid at least until the next report. Consequently, the UE is expected to receive/follow configurations based on the reported correspondence.

After reporting, the network has awareness of the different TX and/or RX capability values/indices (e.g., UE antenna panels). Then, by using this information, the network can control the UE RX and/or TX antenna panel switching by configuring the guard period into the most feasible location in time from a network perspective.

Referring to FIG. 10, in step 1001, a UE transmits, to a network element (e.g., a gNB) of a wireless communication network, an indication indicating at least one of: a transmission capability index for the UE and/or a reception capability index for the UE.

In step 1002, the network element determines, based at least partly on at least one of the transmission capability index and/or the reception capability index, a time-domain location of a guard period.

In step 1003, the network element transmits, to the UE, a configuration indicating the determined time-domain location of the guard period.

In step 1004, the UE determines, based at least partly on the time-domain location of the guard period indicated in the configuration, a spatial direction for a time interval between a first reference signal resource set in a first time slot and a second reference signal resource set in a second time slot.

For example, if the guard period is located in the first time slot after a last resource of the first reference signal resource set, then the spatial direction may be determined by using the second reference signal resource set (e.g., based at least partly on spatial relation information and/or a TCI state associated with the second reference signal resource set).

As another example, if the guard period is located in the second time slot before a first resource of the second reference signal resource set, then the spatial direction for the time interval may be determined by using the first reference signal resource set (e.g., based at least partly on spatial relation information and/or a TCI state associated with the first reference signal resource set).

In step 1005, the UE may switch, during the guard period, at least one of: from a first transmission antenna panel to a second transmission antenna panel, from a first reception antenna panel to a second reception antenna panel, from spatial relation information associated with the first reference signal resource set to spatial relation information associated with the second reference signal resource set, or from a TCI state (e.g., UL TCI state, DL TCI state, or joint DL/UL TCI state) associated with the first reference signal resource set to a TCI state (e.g., UL TCI state, DL TCI state, or joint DL/UL TCI state) associated with the second reference signal resource set. Consequently, the UE may switch from a spatial direction associated with the first reference signal resource set to a spatial direction associated with the second reference signal resource set.

Herein the terms "first transmission antenna panel", "first reception antenna panel", "second transmission antenna panel", and "second reception antenna panel" are used to distinguish the antenna panels, and they do not necessarily mean a specific order or specific indices of the antenna panels.

In step 1006, the UE may transmit one or more uplink transmissions to the network element according to the determined spatial direction during the time interval.

In step 1007, the UE may receive one or more downlink transmissions from the network element according to the determined spatial direction during the time interval.

The steps and/or blocks described above by means of FIGS. 7-10 are in no absolute chronological order, and some of them may be performed simultaneously or in an order differing from the described one. Other steps and/or blocks may also be executed between them or within them. For example, in FIG. 10, if the guard period is located in the second time slot before the first resource of the second reference signal resource set, then step 1005 may be performed after steps 1006 and 1007. On the other hand, if the guard period is located in the first time slot after the last resource of the first reference signal resource set, then step 1005 may be performed before steps 1006 and 1007.

A technical advantage provided by some exemplary embodiments is that they may enhance UL and DL radio resource utilization with UL SRS for antenna switching, when the time interval between two UL SRS resource sets is larger than a guard period. Due to the implicit indication mechanism of some exemplary embodiments, the time of the UE being in the interruption (i.e., not being able to receive DL or transmit UL) may be significantly reduced. Furthermore, some exemplary embodiments may improve system performance in terms of latency and resource overhead, as well as reduce signaling overhead.

Figure 11:
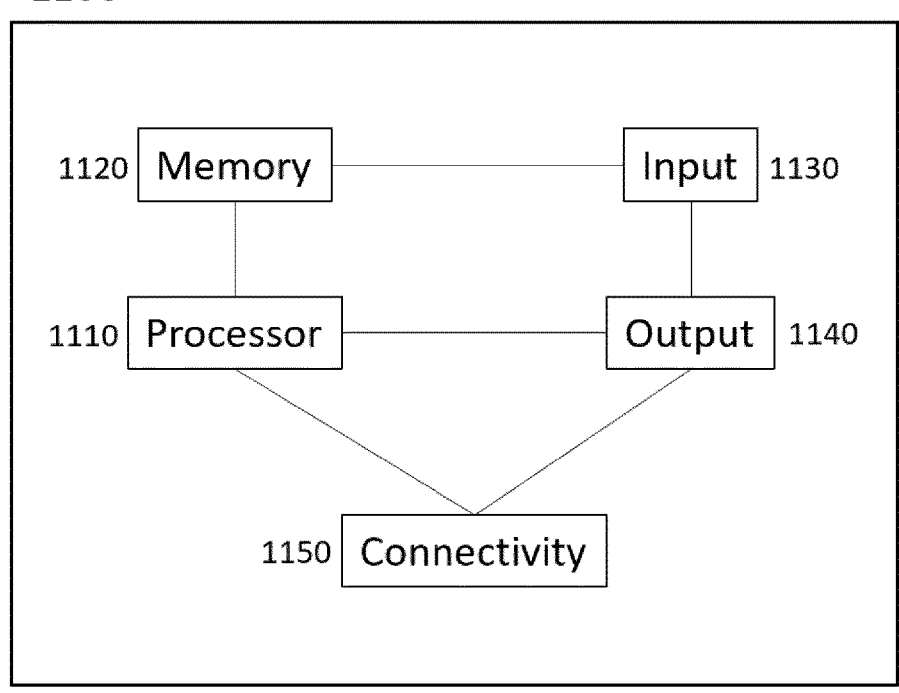
FIGS. 11-12 illustrate apparatuses according to some exemplary embodiments.

FIG. 11 illustrates an apparatus 1100, which may be an apparatus such as, or comprised in, a terminal device, according to an exemplary embodiment. The terminal device may also be referred to as a UE or user equipment herein. The apparatus 1100 comprises a processor 1110. The processor 1110 interprets computer program instructions and processes data. The processor 1110 may comprise one or more programmable processors. The processor 1110 may comprise programmable hardware with embedded firmware and may, alternatively or additionally, comprise one or more application-specific integrated circuits (ASICs).

The processor 1110 is coupled to a memory 1120. The processor is configured to read and write data to and from the memory 1120. The memory 1120 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EE-PROM), flash memory, optical storage or magnetic storage. In general, memories may be referred to as non-transitory computer readable media. The memory 1120 stores computer readable instructions that are executed by the processor 1110. For example, non-volatile memory stores the computer readable instructions and the processor 1110 executes the instructions using volatile memory for temporary storage of data and/or instructions.

The computer readable instructions may have been pre-stored to the memory 1120 or, alternatively or additionally, they may be received, by the apparatus, via an electromagnetic carrier signal and/or may be copied from a physical entity such as a computer program product. Execution of the computer readable instructions causes the apparatus 1100 to perform one or more of the functionalities described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer.

The apparatus 1100 may further comprise, or be connected to, an input unit 1130. The input unit 1130 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 1130 may comprise an interface to which external devices may connect to.

The apparatus 1100 may also comprise an output unit 1140. The output unit may comprise or be connected to one or more displays capable of rendering visual content, such as a light emitting diode (LED) display, a liquid crystal display (LCD) and/or a liquid crystal on silicon (LCoS) display. The output unit 1140 may further comprise one or more audio outputs. The one or more audio outputs may be for example loudspeakers.

The apparatus 1100 further comprises a connectivity unit 1150. The connectivity unit 1150 enables wireless connectivity to one or more external devices. The connectivity unit 1150 comprises at least one transmitter and at least one receiver that may be integrated to the apparatus 1100 or that the apparatus 1100 may be connected to. The at least one transmitter comprises at least one transmission antenna, and the at least one receiver comprises at least one receiving antenna. The connectivity unit 1150 may comprise an integrated circuit or a set of integrated circuits that provide the wireless communication capability for the apparatus 1100. Alternatively, the wireless connectivity may be a hardwired application-specific integrated circuit (ASIC). The connectivity unit 1150 may comprise one or more components such as a power amplifier, digital front end (DFE), analog-to-digital converter (ADC), digital-to-analog converter (DAC), frequency converter, (de) modulator, and/or encoder/decoder circuitries, controlled by the corresponding controlling units.

It is to be noted that the apparatus 1100 may further comprise various components not illustrated in FIG. 11. The various components may be hardware components and/or software components.

Figure 12:
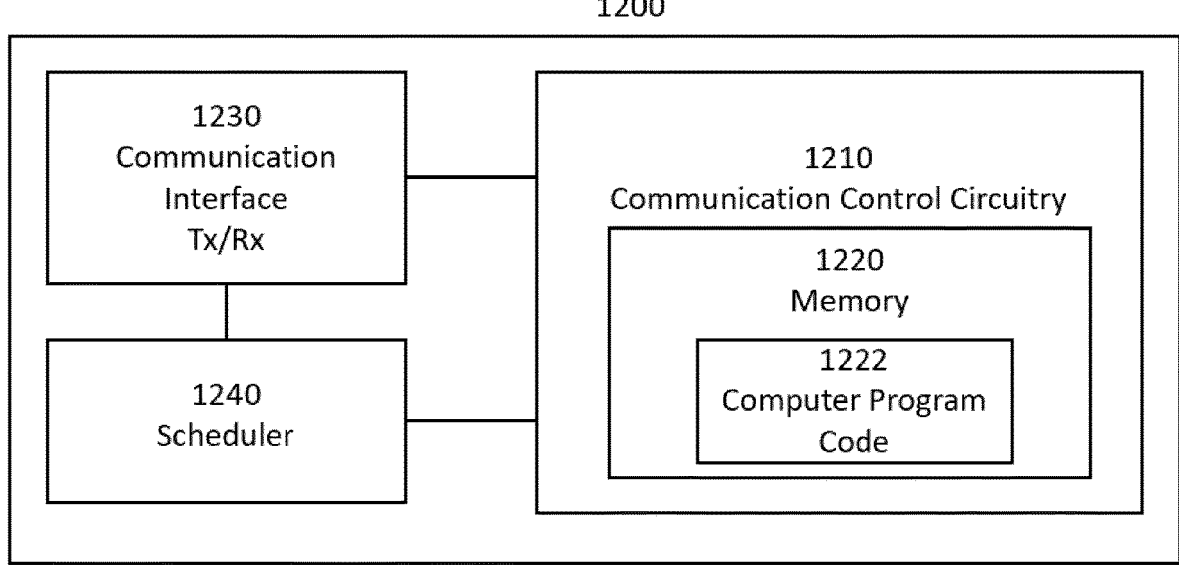

The apparatus 1200 of FIG. 12 illustrates an exemplary embodiment of an apparatus such as, or comprised in, a network element of a wireless communication network. The network element may also be referred to, for example, as a network node, a RAN node, a NodeB, an LTE evolved NodeB (eNB), a gNB, a base station, an NR base station, a 5G base station, an access node, an access point (AP), a distributed unit (DU), a central unit (CU), a baseband unit (BBU), a radio unit (RU), a radio head, a remote radio head (RRH), or a transmission and reception point (TRP). The apparatus 1200 may comprise, for example, a circuitry or a chipset applicable for realizing some of the described exemplary embodiments. The apparatus 1200 may be an electronic device comprising one or more electronic circuitries. The apparatus 1200 may comprise a communication control circuitry 1210 such as at least one processor, and at least one memory 1220 including a computer program code (software) 1222 wherein the at least one memory and the computer program code (software) 1222 are configured, with the at least one processor, to cause the apparatus 1200 to carry out some of the exemplary embodiments described above.

The processor is coupled to the memory 1220. The processor is configured to read and write data to and from the memory 1220. The memory 1220 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EE-PROM), flash memory, optical storage or magnetic storage. In general, memories may be referred to as non-transitory computer readable media. The memory 1220 stores computer readable instructions that are executed by the processor. For example, non-volatile memory stores the computer readable instructions and the processor executes the instructions using volatile memory for temporary storage of data and/or instructions.

The computer readable instructions may have been pre-stored to the memory 1220 or, alternatively or additionally, they may be received, by the apparatus, via an electromagnetic carrier signal and/or may be copied from a physical entity such as a computer program product. Execution of the computer readable instructions causes the apparatus 1200 to perform one or more of the functionalities described above.

The memory 1220 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data. For example, the configuration database may store a current neighbour cell list, and, in some exemplary embodiments, structures of the frames used in the detected neighbour cells.

The apparatus 1200 may further comprise a communication interface 1230 comprising hardware and/or software for realizing communication connectivity according to one or more communication protocols. The communication interface 1230 comprises at least one transmitter (Tx) and at least one receiver (Rx) that may be integrated to the apparatus 1200 or that the apparatus 1200 may be connected to. The communication interface 1230 provides the apparatus with radio communication capabilities to communicate in the cellular communication system. The communication interface may, for example, provide a radio interface to terminal devices. The apparatus 1200 may further comprise another interface towards a core network such as the network coordinator apparatus and/or to the access nodes of the cellular communication system. The apparatus 1200 may further comprise a scheduler 1240 that is configured to allocate resources.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s)), software, and memory(ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. An apparatus comprising at least one processor, and at least one memory including computer program code, wherein the at least one memory and the computer program code are configured, with the at least one processor, to cause the apparatus to:
    determine a spatial direction for a time interval between a first reference signal resource set in a first time slot and a second reference signal resource set in a second time slot; and
    transmit one or more uplink transmissions and/or receive one or more downlink transmissions according to the determined spatial direction during the time interval.

2. The apparatus according to claim 1, wherein the apparatus is further caused to: determine, based at least partly on a time-domain location of a guard period, the spatial direction for the time interval.

3. The apparatus according to claim 2, wherein the time interval between the first reference signal resource set and the second reference signal resource set is larger than the guard period.

4. The apparatus according to claim 2, wherein the apparatus is further caused to:

switch, during the guard period, at least one of:

from a first transmission antenna panel to a second transmission antenna panel;

from a first reception antenna panel to a second reception antenna panel;

from spatial relation information associated with the first reference signal resource set to spatial relation information associated with the second reference signal resource set; or from a transmission configuration indicator state associated with the first reference signal resource set to a transmission configuration indicator state associated with the second reference signal resource set.

5. The apparatus according to claim 4, wherein the spatial direction for the time interval is determined based at least partly on the spatial relation information and/or the transmission configuration indicator state associated with the second reference signal resource set, in response to the guard period being located after a last resource of the first reference signal resource set in the first time slot.

6. The apparatus according to claim 4, wherein the spatial direction for the time interval is determined based at least partly on the spatial relation information and/or the transmission configuration indicator state associated with the first reference signal resource set, in response to the guard period being located before a first resource of the second reference signal resource set in the second time slot.

7. The apparatus according to claim 2, wherein the apparatus is further caused to:

transmit, to a network element, an indication indicating at least one of a transmission capability set value or index for the apparatus, or a reception capability set value or index for the apparatus; and receive, in response to transmitting the indication, a configuration indicating the time-domain location of the guard period.

8. The apparatus according to claim 1, wherein a resource of an uplink reference signal or a downlink reference signal is used as spatial relation information for either the first reference signal resource set or the second reference signal resource set, and wherein the resource is used for determining the spatial direction for transmission and/or reception during the time interval.

9. The apparatus according to claim 8, wherein the downlink reference signal comprises a synchronization signal block.

10. The apparatus according to claim 1, wherein the apparatus is further caused to:

receive, from a network element, an indication indicating at least one of spatial relation information for the time interval, a downlink transmission configuration indicator state for the time interval, an uplink transmission configuration indicator state for the time interval, or a joint transmission configuration indicator state for downlink and uplink for the time interval; and determine, based at least partly on the indication received from the terminal device, the spatial direction for the time interval.

11. The apparatus according to claim 1, wherein the first reference signal resource set comprises a first sounding reference signal resource set for antenna switching, and wherein the second reference signal resource set comprises a second sounding reference signal resource set for antenna switching.

12. An apparatus comprising at least one processor, and at least one memory including computer program code, wherein the at least one memory and the computer program code are configured, with the at least one processor, to cause the apparatus to:

indicate, to a terminal device, a spatial direction for a time interval between a first reference signal resource set in a first time slot and a second reference signal resource set in a second time slot; and receive one or more uplink transmissions from the terminal device and/or transmit one or more downlink transmissions to the terminal device during the time interval.

13. The apparatus according to claim 12, wherein the apparatus is further caused to:

receive, from the terminal device, an indication indicating at least one of a transmission capability set value or index for the terminal device or a reception capability set value or index for the terminal device;

determine, based at least partly on the indication received from the terminal device, a time-domain location of a guard period; and transmit, to the terminal device, a configuration indicating the time-domain location of the guard period, wherein the time-domain location of the guard period indicates the spatial direction for the time interval.

14. The apparatus according to claim 12, wherein the spatial direction is indicated by transmitting, to the terminal device, an indication indicating at least one of spatial relation information for the time interval, a downlink transmission configuration indicator state for the time interval, an uplink transmission configuration indicator state for the time interval, or a joint transmission configuration indicator state for downlink and uplink for the time interval.

15. A method comprising:

determining, at a terminal device, a spatial direction for a time interval between a first reference signal resource set in a first time slot and a second reference signal resource set in a second time slot; and transmitting, by the terminal device, one or more uplink transmissions and/or receiving, at the terminal device, one or more downlink transmissions according to the determined spatial direction during the time interval.

16. The method according to claim 15, wherein the method further comprises:

determining, based at least partly on a time-domain location of a guard period, the spatial direction for the time interval.

17. The method according to claim 16, wherein the time interval between the first reference signal resource set and the second reference signal resource set is larger than the guard period.

18. The method according to claim 16, wherein the method further comprises:

switching, during the guard period, at least one of:

from a first transmission antenna panel to a second transmission antenna panel;

from a first reception antenna panel to a second reception antenna panel;

from spatial relation information associated with the first reference signal resource set to spatial relation information associated with the second reference signal resource set; or from a transmission configuration indicator state associated with the first reference signal resource set to a transmission configuration indicator state associated with the second reference signal resource set.

19. The method according to claim 18, wherein the spatial direction for the time interval is determined based at least partly on the spatial relation information and/or the transmission configuration indicator state associated with the second reference signal resource set, in response to the guard period being located after a last resource of the first reference signal resource set in the first time slot.

20. The method according to claim 18, wherein the spatial direction for the time interval is determined based at least partly on the spatial relation information and/or the transmission configuration indicator state associated with the first reference signal resource set, in response to the guard period being located before a first resource of the second reference signal resource set in the second time slot.

\* \* \* \* \*